Nov. 6, 1945.  E. V. GARNETT ET AL  2,388,403
MOUNTING FOR DUAL WHEELS
Original Filed May 27, 1940
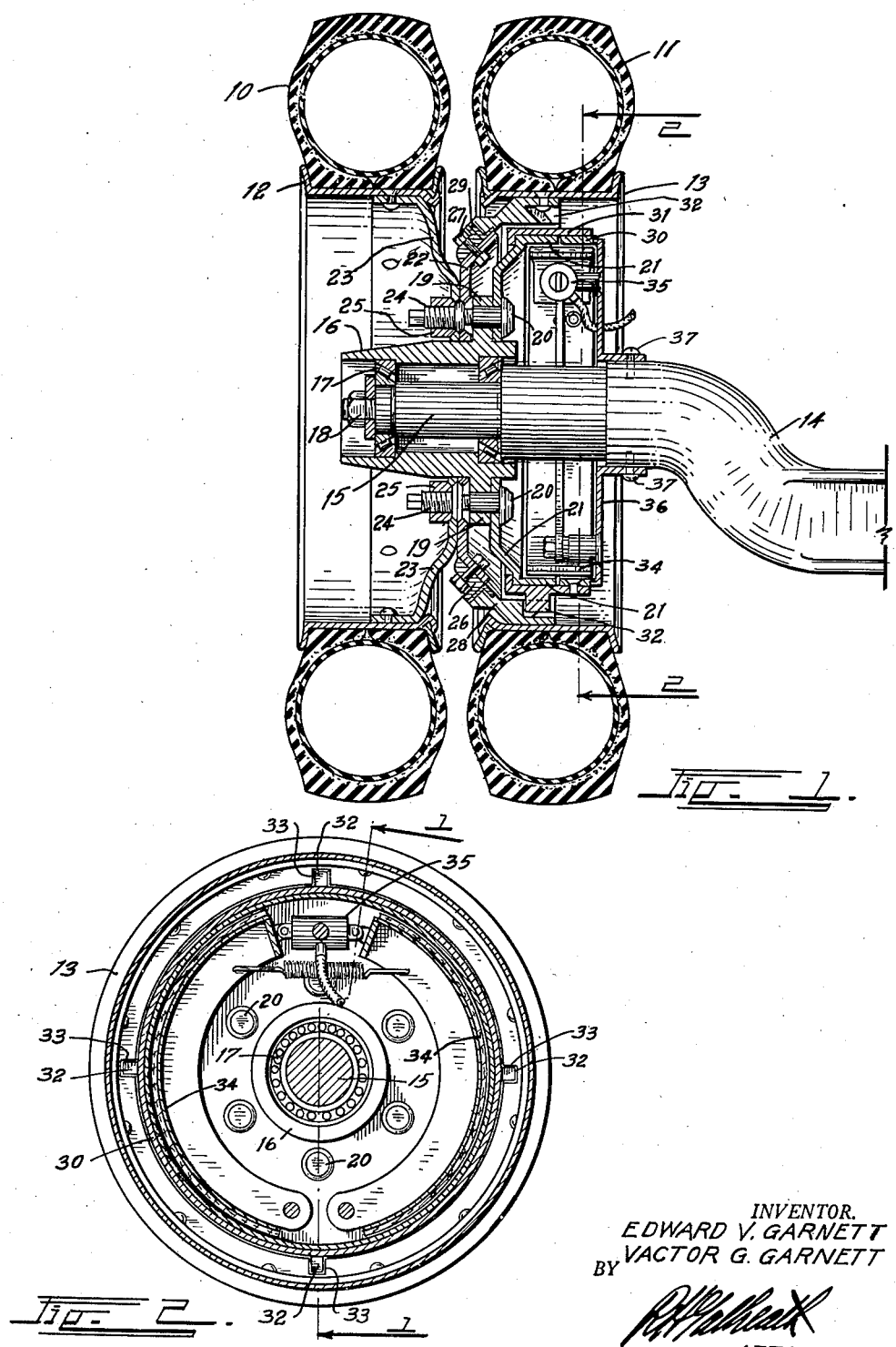
INVENTOR.
EDWARD V. GARNETT
BY VACTOR G. GARNETT
ATTORNEY.

Patented Nov. 6, 1945

2,388,403

UNITED STATES PATENT OFFICE 2,388,403

MOUNTING FOR DUAL WHEELS

Edward V. Garnett and Vactor G. Garnett, Denver, Colo.

Original application May 27, 1940, Serial No. 337,482. Divided and this application October 11, 1944, Serial No. 558,164

7 Claims. (Cl. 188—18)

This invention relates to a dual wheel mounting for vehicles of the type illustrated in applicant's U. S. Patent No. 2,345,192, of which this application is a division. The principal object of the invention resides in the provision of a simple and highly efficient construction which will employ standard parts and which will allow one of the dual wheels to move differentially of the other wheel.

Another object of the invention is to provide a construction of this character in which the two wheels will be independently braked by means of a single brake mechanism.

A further object is to so construct the device that the wheels can be quickly and easily removed without disturbing the brake mechanism and without disturbing the mountings of the wheels or their bearings.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a vertical section through a pair of dual wheels with the principles of the invention applied thereto; and Fig. 2 is a cross section taken on the line 2—2, Fig. 1, with the tires omitted.

In Fig. 1, the outer tire of a dual wheel is illustrated at 10, the inner tire at 11, the outer wheel rim at 12, inner wheel rim at 13, axle at 14, and axle spindle at 15.

The improved dual wheel mounting employs a hub member 16 mounted upon suitable wheel bearings 17, upon the spindle 14. The bearings and the spindle may be of the standard type used at present on dual wheels. The bearings and the hub member 16 are locked in place by means of a single retaining nut 18 and may be sealed by means of the usual hub cap (not shown).

The hub member 16 is formed with an annular projecting wheel flange 19 through which standard wheel bolts 20 project. A first brake drum 21 is secured to the inner face of the flange 19 by means of the bolts 20. An inner wheel disc 22 and an outer disc wheel 23 are secured in place on the outer face of the flange 21 by means of the bolts 20, there being an inner nut 24 clamped against the wheel disc 22 and an outer nut 25, threaded on the inner nut and clamped against the outer disc wheel 23 as is usual in dual wheel construction. The wheel 23 and its rim 12 are of the standard pressed steel variety used on trucks and the like.

The peripheral edge of the wheel disc 22 is dished to form one side of an annular V-shaped channel about the axis of the spindle 14. The other side of the channel is closed by means of an annular bearing ring 26 which is secured to the disc 22 by means of suitable bolts 27. An inner wheel member 28, to which the inner rim 13 is secured, is formed with a wedge-shaped annular bearing surface which rides concentrically about the axis of the spindle in the V-shaped channel. A suitable V-shaped annular bearing bushing 29 is interposed between the bearing surface of the inner wheel member 28 and the channel between the inner wheel disc 22 and the ring 26 to provide a suitable friction surface.

It can be readily seen that either tire 10 or 11 can be rotated about its axis independently of the other, the differential being taken up by friction in the V-shaped bearing channel between the wheels. It can also be seen that the road thrust of the axle spindle 15 is equally distributed to both tires from a point intermediate the bearings 17 so that a desirable central load thrust is obtained without the twisting strains of the usual one-sided cantilever mounting.

An inner brake drum 30 is mounted in alignment with the first brake drum 21. The inner brake drum is supported from a telescoping band 31 about the first drum 21. This band is formed with clutching lugs 32 at spaced points about its periphery which engage in notches 33 formed in the inner wheel disc 22. The lugs cause the inner brake drum 30 to rotate with the inner tire 11.

A single set of brake shoes 34 is mounted within the drums 21 and 30 so as to overlap both drums. The brake shoes are actuated by any of the usual mechanical or hydraulic mechanisms, indicated at 35, mounted on a brake disc 36. The brake disc 36 is, in turn, mounted on the axle 14 such as indicated at 37.

It will be noted that the outer wheel can be easily removed and replaced by simply removing the nuts 25 and that the inner wheel can be similarly removed by removing the inner nuts 24. Removal of the wheels does not disturb the brake mechanism as the inner wheel simply slides from the lugs 32 as it is withdrawn. Access may be had to the brake mechanism by removal of the retaining nut 18 and the hub member 16.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A dual wheel construction for vehicles comprising: a hub member; bearings in said hub member for journalling the latter on an axle spindle; a first dual wheel secured to said hub member; a wheel disc secured to said hub member; an annular bearing on said wheel disc; a second dual wheel mounted on said annular bearing so as to be independently rotatable from said first wheel; and braking means for exerting a frictional retarding action on both wheels simultaneously.

2. A dual wheel construction for vehicles comprising: a hub member; bearings in said hub member for journalling the latter on an axle spindle; a flange projecting from and surrounding said hub member; an inner wheel disc detachably secured on the outer face of said flange; an outer wheel detachably secured on the outer face of said inner wheel disc; and an inner wheel rotatably mounted on said inner wheel disc.

3. A dual wheel construction for vehicles comprising: a hub member; bearings in said hub member for journalling the latter on an axle spindle; a flange projecting from and surrounding said hub member; an inner wheel disc detachably secured on the outer face of said flange; an outer wheel detachably secured on the outer face of said inner wheel disc; an inner wheel rotatably mounted on said inner wheel disc; and a removable retaining member maintaining said inner wheel in place on said inner wheel disc.

4. A dual wheel construction for vehicles comprising: a hub member; bearings in said hub member for journalling the latter on an axle spindle; a flange projecting from and surrounding said hub member; an inner wheel disc detachably secured in the outer face of said flange; an outer wheel detachably secured on the outer face of said inner wheel disc; an inner wheel rotatably mounted on said inner wheel disc; a brake drum secured on the inner face of said flange; and means for exerting a retarding action on said brake drum.

5. A dual wheel construction for vehicles comprising: a hub member; bearings in said hub member for journalling the latter on an axle spindle; a flange projecting from and surrounding said hub member; an inner wheel disc detachably secured on the outer face of said flange; an outer wheel detachably secured on the outer face of said inner wheel disc; an inner wheel rotatably mounted on said inner wheel disc; a first brake drum secured on the inner face of said flange; a second brake drum positioned in alignment with the inner edge of said first brake drum; means on said inner wheel for engaging said second drum when said wheels are in place; and means for exerting a retarding action on both drums simultaneously.

6. A dual wheel construction for vehicles comprising: a hub member; bearings in said hub member for journalling the latter on an axle spindle; a flange projecting from and surrounding said hub member; an inner wheel disc detachably secured on the outer face of said flange; an outer wheel detachably secured on the outer face of said inner wheel disc; an inner wheel rotatably mounted on said inner wheel disc; a first brake drum secured on the inner face of said flange; a second brake drum; means for supporting said second brake drum in alignment with the inner edge of said first brake drum and independently rotatable in relation to the latter; means on said inner wheel for detachably connecting said second drum thereto when the wheels are placed in position; and means for exerting a retarding action on both drums.

7. A dual wheel construction for vehicles comprising: a hub member; bearings in said hub member for journalling the latter on an axle spindle; a flange projecting from and surrounding said hub member; an inner wheel disc detachably secured on the outer face of said flange; an outer wheel detachably secured on the outer face of said inner wheel disc; an inner wheel rotatably mounted on said inner wheel disc; a first brake drum secured on the inner face of said flange; a second brake drum; means for supporting said second brake drum in alignment with the inner edge of said first brake drum and independently rotatable in relation to the latter; lugs on said inner brake drum adapted to be received in receiving notches in said inner wheel to connect the latter to the inner brake drum; and means for exerting a retarding action on both drums.

EDWARD V. GARNETT.
VACTOR G. GARNETT.